2,101,150

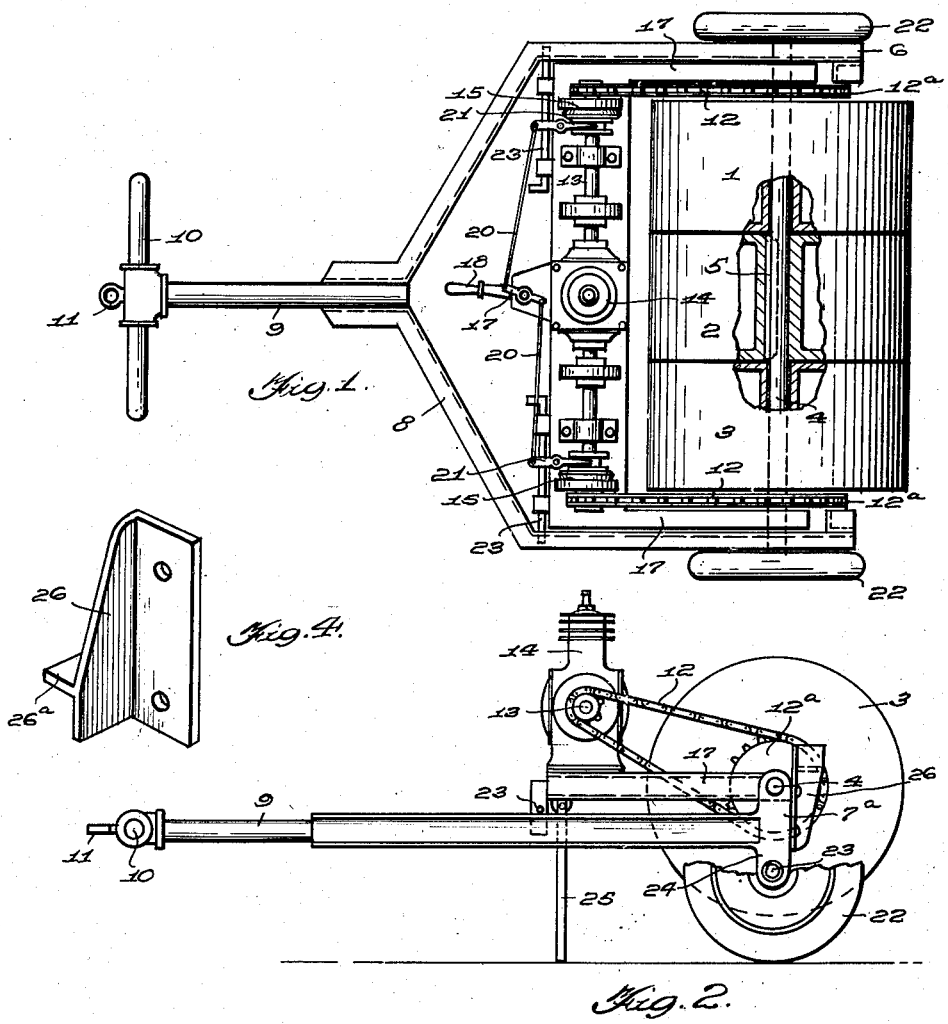
Dec. 7, 1937. B. MOORE, JR 2,101,150
MOTOR PROPELLED WHEELED ROLLER
Filed May 6, 1936
Inventor
Bart Moore Jr.
By Samuel Herrick
Attorney Patented Dec. 7, 1937

UNITED STATES PATENT OFFICE 2,101,150

MOTOR PROPELLED WHEELED ROLLER

Bart Moore, Jr., San Antonio, Tex.

Application May 6, 1936, Serial No. 78,283

6 Claims. (Cl. 94—50)

This invention relates to road rollers, and more particularly to rollers of the character of that illustrated in the patent issued to E. V. Biles on November 8, 1932, and also of the character of that illustrated in my co-pending application, Serial No. 73,755, filed on the 10th day of April, 1936.

The rollers shown in the patent and application aforesaid are characterized by the fact that they are provided with ground wheels eccentrically mounted with respect to the roller, in such manner that by the act of swinging the tongue or draw bar bodily over in a vertical plane from one side of the axis of the rollers to the other, the roller is either lowered into contact with the ground or elevated from the ground to be supported by the ground wheels when being transported from place to place of use.

In the patent to Biles, aforesaid, no means are provided for propelling the roller, other than as the same may be towed behind a truck. In the application, aforesaid, I have illustrated an engine and means for driving either the rollers or the ground wheels from the engine, the engine being bodily invertible with the frame.

According to the present apparatus, an engine is provided for propelling the rollers but is carried by a frame separate from the tongue or draw bar, so that the latter may be swung over to raise or lower the roller as described while leaving the engine in an upright position at all times. Further objects and advantages of the invention will be set forth in the detailed description which follows.

In the accompanying drawing, wherein like reference characters designate corresponding parts throughout the several figures:

Fig. 1 is a plan view of an apparatus constructed in accordance with the invention;

Fig. 2 is a partial end view with one of the ground wheels removed, showing the parts in the position they would occupy when supported upon the ground wheels;

Fig. 3 is a view like Fig. 2, but with the parts moved to the position that they occupy when the roller is in engagement with the ground, and Fig. 4 is a detail view of a bracket, hereinafter described.

In the accompanying drawing, characters 1, 2, and 3 designate roller sections which are mounted upon a shaft 4. The sections 1 and 3 are free to rotate on this shaft, while the section 2 is keyed to the shaft, as indicated at 5, and acts as the propelling element when the rollers are in contact with the ground.

The shaft is mounted for rotation in suitable bearings in the side frame members 6 and 7 of a yoke 8. A tongue 9 is secured to this yoke and carries a T-handle 10, by which the roller may be guided as it is propelled by the engine, hereinafter described. An eye 11, secured to the head of the handle, provides means for attaching the apparatus to a truck or other vehicle by which it may be drawn from place to place when mounted upon the ground wheels.

The shaft 4 is driven by sprocket gearing 12 from shaft 13 of an engine. Clutches 15, disposed in the line of drive, provide means for connecting and disconnecting the engine at will. The engine is supported upon a frame consisting of a platform 16 and legs 17, the legs 17 being pivoted upon shaft 4.

The handle 18 operates a rock lever 19, to act through links 20 and clutch shifting forks 21 to simultaneously engage or disengage the clutch elements. The ground wheels 22 are mounted upon stub spindles 23, said spindles being carried by extensions 24 of the yoke arms 7, and it will be observed by referring to Figs. 2 and 3 that the spindles 23 are eccentrically disposed with respect to shaft 4.

Thus, when the tongue 9 is in the position illustrated in Fig. 2, the roller will be elevated from the ground and supported upon the ground wheels, while when the tongue is swung over to the position illustrated in Fig. 3, the roller will first be lowered into engagement with the ground and then continued movement of the tongue will lift the ground wheels into the air.

When the parts are in the position illustrated in Fig. 2, the engine carrying frame is latched to the yoke 8 by bolts 23, the outer ends of which engage over the side frame members of the yoke. When it is desired to move the tongue from the position illustrated in Fig. 2 to that illustrated in Fig. 3, the tongue is first lifted slightly and a supporting leg 25 is swung downwardly, to lie vertically and support the engine and its carrying frame. Then the bolts 23 are retracted, so that the tongue and its yoke may be swung over without carrying the engine supporting frame with it.

The act of swinging the frame over to the position illustrated in Fig. 3 brings brackets 26, which are secured to the vertical extension 7a of the arms 7, from the position illustrated in Fig. 2 to the position illustrated in Fig. 3, at which latter time a foot or shelf 26a of each of said brackets is brought to bear against and to support the underside of the engine carrying frame. The leg 25 may then be swung upwardly against the underside of the engine carrying frame, and the roller will be ready for operation under the power of the engine.

While I have illustrated the drive as being from the engine to the shaft 4, I wish it to be understood that I may make all of these roller sections in one piece and secure the sprocket wheels 12ª, constituting part of the sprocket drive, directly to the ends of this one piece roller. That, of course, is a mere engineering detail and a matter of choice. Further, I may drive from one end of the roller only, if desired.

Having described my invention, what I claim is:

1. The combination with a road rolling structure comprising a bodily invertible main frame, a road roller mounted to turn therein, and ground wheels mounted to turn with respect to said bodily invertible frame and eccentrically disposed with respect to the axis of the roller, whereby either the ground wheels or the roller may be brought into engagement with the ground by the act of bodily swinging the main frame over from one side of the roller to the other, of an engine supporting frame disposed within the confines of the main frame and pivotally mounted with respect to said main frame to thereby permit the aforesaid inversion of the main frame without causing corresponding inversion of the engine supporting frame, an engine carried by said frame, means for driving from said engine to the roller, and means for latching the engine frame to the main frame to thereby support the engine supporting frame from the main frame.

2. The combination with a bodily invertible frame, of a road roller and ground wheels carried by said frame, the axis of the ground wheels upon said frame being eccentric with respect to the axis of the roller, whereby bodily inversion of said frame brings the road roller into engagement with the road and elevates the ground wheels, or vice versa, an engine carrying frame pivoted with respect to both the roller and the bodily invertible frame at the axis of the roller, means for driving from said engine to the roller and means for supporting said engine carrying frame from the first-named frame at each of the limits of movement of said first-named frame.

3. The combination with a road roller, a bodily invertible main frame in which said roller is journaled, ground wheel mountings carried by said frame in a position eccentric to the axis of the roller, a draft tongue constituting a part of said frame, an engine carrying frame comprising a platform and legs pivoted with respect to the shaft of the roller, an engine mounted upon said platform, driving means between the engine and the roller, including a clutch, detachable latching means for connecting the engine carrying frame to the main frame when said main frame is at one of its limits of movement, and means carried by the main frame and movable into supporting position with respect to the engine carrying frame in the act of swinging the main frame to its other position.

4. A structure as recited in claim 1, in combination with brackets carried by the main frame and adapted to underlie and support the engine carrying frame in one of the positions of the main frame.

5. In combination, a road roller, a shaft constituting the axis about which said roller turns; a bodily invertible main frame comprising longitudinally extending side frame members in which said shaft is supported, a draft tongue and connections between the side frame members and the draft tongue; ground wheels journaled upon the side frame members and in such eccentric relation to the said shaft that bodily lifting of the roller may be effected by swinging the draft tongue over from one side of the roller to the other, an engine, a frame upon which the engine is mounted, said frame including longitudinally extending legs which are journaled upon the said roller shaft, said frame and engine lying wholly within the confines of the invertible main frame in such manner that complete inversion of the main frame may be effected without imparting swinging movement to the engine carrying frame, and means for driving said roller from said engine.

6. A structure as recited in claim 5, in combination with means carried by the main frame and engageable beneath the legs of the engine carrying frame to support the latter from the former when the draft tongue is on that side of the road roller remote from the engine.

BART MOORE, Jr.